April 2, 1968
R. L. SKINNER, SR
3,375,571
METHOD OF MAKING SEALS
Filed Aug. 17, 1967
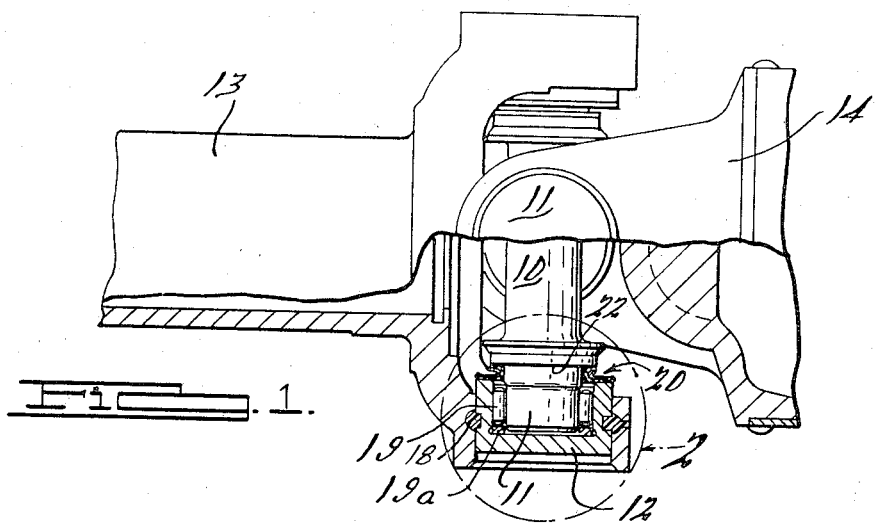
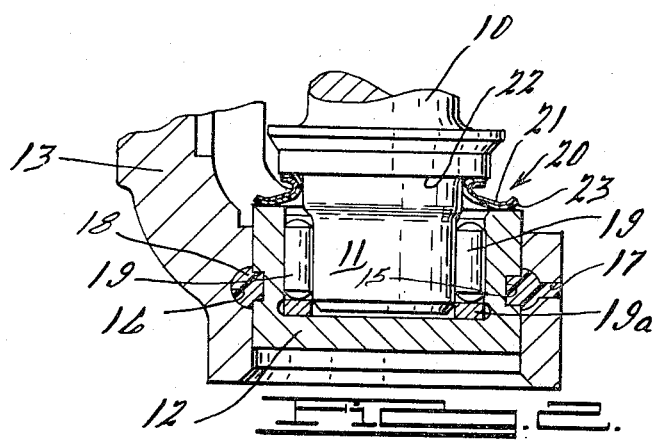
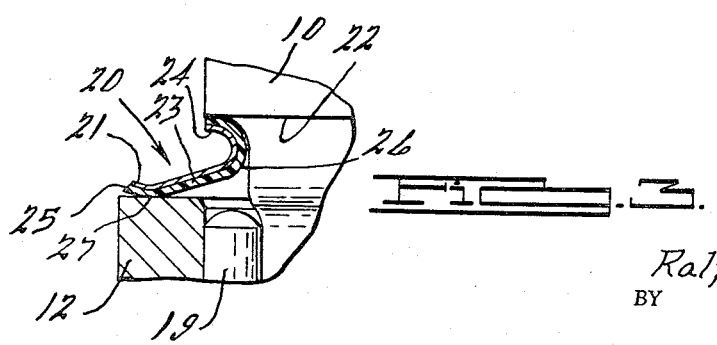
INVENTOR.
Ralph L. Skinner, Sr.
BY
ATTORNEYS.

3,375,571
METHOD OF MAKING SEALS
Ralph L. Skinner, Sr., Birmingham, Mich., assignor to Renniks Corporation, Birmingham, Mich., a corporation of Michigan
Original application June 17, 1965, Ser. No. 464,803, now Patent No. 3,352,127, dated Nov. 14, 1967. Divided and this application Aug. 17, 1967, Ser. No. 661,416
2 Claims. (Cl. 29—480)

This invention relates broadly to a method of making seals and more particularly to a method of making seals primarily adapted and preeminently suited for use with universal joints and the like. This application is a division of my co-pending application, United States Ser. No. 464,803 filed June 17, 1965, now Patent No. 3,352,127.

If used in connection with universal joints, the seal is adapted for sealing between the bearing cups or races and the main body portion or cross.

An important object of this invention is to provide a method of making a seal that is inexpensive to produce and therefore competitive with existing seals. Another object is to provide a method of making a seal that is capable of long life in service and, when used in association with automobile universal joints, will last for the warranty period applicable to these parts and desirably for the operating life of the vehicle itself. Still another object of the invention is to provide a method of making a seal of the above-mentioned character that is easy to install as, for instance, by automatic means. Also, in the case of universal joints, objects of this invention are to provide a method of making a seal that is efficient in retaining lubricant normally provided in the bearing races and in the trunnions which support the races, in excluding dust and road splash from the bearings and other internal parts, and which is relatively invulnerable to mechanical abuse as by being struck with flying stones and the like and to the effects of weather. Another object is to provide a method of making a seal that will remain effective within normal manufacturing tolerances.

The above and many other objects and advantages of the invention are attained by the seal of this invention which has an annular, U-shaped body member of spring metal covered on at least the side thereof which makes contact with the parts to be sealed by a facing layer of a suitable tetrafluorocarbon resin material such as that sold commercially under the name of Teflon. When the seal is adapted for a universal joint, one flange thereof preferably is made narrower than the other and it probably is more accurately described as J-shaped; however, for the purpose of this invention at least it is contemplated that both of these forms be included in the term "U-shaped."

In use, both flanges of the seal engage and make sealing contact with parts to be sealed, and the seal normally is compressed axially at least slightly so that each flange constantly energizes the other and thus assists in maintaining an effective sealing contact at all times. In the case of a universal joint seal, the narrow flange and the bight portion are essentially stiff so that most of the spring action takes place in the relatively wide flange.

Conventional universal joints require a seal on each of the four trunnions; and, in each instance, the seal is disposed at the inner end of the trunnion with the narrow spring flange engaging a radial shoulder on the cross body and the wide spring flange engaging the adjacent face of the bearing cup or race. The metal spring backing member should be thin and flexible and the wide flange should be as wide as possible to get the maximum spring action and to accommodate normal manufacturing tolerances while maintaining adequate but not excessive pressure. The inner narrow spring flange seals at the cross body, holds the outer wider spring flange in sealing engagement with the race, and maintains the seal properly at right angles to the center line of the trunnion at all times.

The seal is larger in diameter at the bight than the trunnion on which the seal is adapted to be mounted so as not to interfere with proper engagement of the sealing flanges with the surfaces to be sealed or with turning or rotative movement of the seal in use. The seal as a whole is floatingly supported in the annular recess at the juncture of the trunnion and the cross body so that an effective sealing contact is obtained by both flanges of the seal.

The backing of the seal preferably is of work hardenable metal (ideally a steel known in the trade as the "300 series") so that it can be work hardened and thus made springy and resilient by forming and shaping operations performed after the Teflon has been bonded thereto and without the use of heat. Thus, the Teflon layer can be applied first to the flat and unformed sheet metal from which the metal backing is made and the Teflon coated metal then shaped in some suitable manner as by suitable drawing and die-forming operations to make the seal.

From the foregoing, it will be apparent that, considered in its broader aspects, the seal of this invention comprises two basic elements (one) a nonabrasive flexible facing material and (two) means for holding this facing material constantly in contact with the parts to be sealed. In the specific form of the invention shown, these elements are combined into one member by bonding a thin Teflon sheet to a work hardenable metal member and the composite member is then formed to a particular unique shape and size in which it functions efficiently as a seal. Satisfactory performance of the seal requires optimum relations between several parameters. For example, a minimum load permitting satisfactory sealing should be maintained at the contact surfaces and the maximum load at these points should be limited to prevent excessive wear and overstressing. In general, the load applied at the sealing surfaces is a function of the deflection of the spring element and therefore a function of the spring rate. The deflection of the spring element is, in turn, dependent on the dimensional tolerances of the various parts of the joint since these dimensions determine the spatial limits in which the seal must function. The maximum stress on the spring metal backing is at the base, inner diameter, of the low-rate outer spring flange. This stress is a function of the rate and deflection of the spring, and must be held below the elastic limit of the steel which, in a typical construction, may range from 130,000 to 260,000 p.s.i.

The device of this invention is of simple construction and may be easily and economically manufactured and quickly installed, and is so reduced in the number and character of its component parts as to approach the ultimate in structural simplicity.

The various objects and advantages, and the novel details of construction of one commercially practical embodiment of the invention, will become more apparent as this description proceeds, especially when considered in connection with the accompanying drawings, in which:

FIGURE 1 is an elevational view, partly in section, of a universal joint equipped with a seal embodying the features of this invention;

FIGURE 2 is an enlarged fragmentary sectional view of the portion enclosed in circle 2 in FIGURE 1; and FIGURE 3 is a detail sectional view of a portion of FIGURE 2.

As suggested, the novel features of this invention may be employed to advantage wherever an annular seal is required, and the universal joint here shown illustrate a typical use for such a seal. In this environment, the seal extends in the plane of the spring flanges; viz, with the flanges extending radially outwardly from the center or central axis of the seal. However, if the situation required it, the seal could function equally well with the spring flanges extending parallel to the central axis. With this thought and reservation in mind, a detailed description of the particular form of universal joint seal here shown by way of example is now given.

The universal joint here shown consists of the usual cross 10 provided with four right angularly related, radially extending trunnions 11. Rotatably mounted on each trunnion 11 is a cup-shaped bearing race 12. The reference characters 13 and 14 indicate the usual spiders having inner yoke portions which are adapted to be connected to respective pairs of opposed bearing races 12 in any suitable manner. Shank portions at the outer ends of the spiders 13 and 14 are adapted to be attached in the usual manner to drive and driven shafts respectively (not shown) which are thus connected for mutual rotation through the universal joint assembly. In the particular form of the invention here shown each pair of races 12 is disposed in aligned openings formed in the yoke of its respective spider and each race is provided with an annular external groove 15 which registers with an internal groove 16 in the opening in which it is received. A plastic material 18 or the like is injected into the registering grooves 15 and 16 through radial openings 17 in the yoke, and when this plastic material has hardened it forms an annular ring or key which holds the race securely in place. Obviously, other means may be provided for securing the bearing races 12 to the yokes.

The reference character 19 designates antifriction roller bearings interposed between the trunnions 11 and the bearing races 12. A thrust washer 19a provided in each of the races seats the outer ends of the bearings 19 and holds the latter properly in alignment.

The seal forming the subject matter of this invention is indicated generally by the reference numeral 20. It is annular in form and substantially U-shaped in cross section although in the particular form shown the flange 25 is substantially wider than the other flange 24. The seal proper comprises a backing of spring metal 21 having a facing layer 23 of Teflon or the like bonded thereto in any suitable or conventional manner. It is not practical using current bonding techniques to bond the Teflon facing layer to the spring metal backing after the latter is formed. It simply is not possible to get a good bond if this is done. The solution to this problem is to bond the Teflon to a flat sheet of metal backing which is not initially springy or resilient but which is work hardenable. In the manufacture of the seal, an annular ring of the Teflon coated metal is first stamped out and the blank thus formed is then shaped in any suitable manner as by spinning or die-forming to the particular form here shown and described. This can be done without harming the inter-metal Teflon bond; and, as the seal is formed, the metal backing work hardens and acquires the necessary spring and resilience to maintain adequate sealing pressure between the Teflon facing and the surfaces to be sealed under normal variations in size due to manufacturing tolerances. The problem is further complicated, of course, by the fact that the metal member 21 cannot be heat hardened after the Teflon has been applied, because the temperature required would be higher than the Teflon can stand.

In practice, the seals 20 are mounted on the trunnions 11 of the universal joint with the relatively narrow flange portions 24 thereof against radial shoulders 22 normally provided at the inner ends of the trunnions and the relative wide flange portions 25 against the inner ends of the bearing races 12. As shown in the drawings, the mentioned ends of the races 12 normally extend radially outwardly substantially farther than the shoulders 22, and it is desirable that the seal flanges 24 and 25 extend coterminously with the surfaces on which they seat. Thus, the inner flanges 24 seat against and extend to the peripheries of the shoulders 22 and the outer flanges 25 seat against and extend to the peripheries of the bearing races 12. The relatively narrow inner flanges 24 may flex slightly when the seals 20 are compressed between the races 12 and the shoulders 22 but in general the action of these flanges and of the bight portions 26 is essentially stiff. Thus, these portions of the seals 20 define what might be termed a high-rate spring. The relatively wide outer flanges 25 on the other hand flex relatively easily and the flexure is distributed over the entire width of the flanges from the bight portions 26 to the points of engagement with the bearing races 12. As a result, the flanges 24 define relatively low-rate cantilever springs.

The inner or bight portions of the seals 20 are spaced radially outwardly from the trunnions 11 to assure good sealing contact between the inner flanges 24 and the shoulders 22 and to permit the seals to float on the trunnions so that the seals are free to turn or move as required in use. This free floating mounting of the seals is important to maintain an effective sealing engagement between the flanges 24 and 25 and the surfaces engaged thereby and to permit the seals to accommodate variations in the spacing between the surfaces due to manufacturing tolerances and the like.

Also, the seal is made sufficiently wide; viz, with the flanges 24 and 25 spaced sufficiently farther apart than the maximum permissible spacing between the shoulder 22 and the end of the bearing race 12 so that the flanges of the seal 20 are necessarily collapsed or squeezed slightly together at assembly. This initial compression of the seal 20 energizes the sealing flanges 24 and 25 and assures a proper sealing engagement between the flanges and the surfaces engaged by them. Manifestly, any binding between the bight portion 26 of the seal and the trunnion 11 would interfere with or perhaps even prevent proper engagement of the inner flange 24 with the shoulder 22. However, when adequate radial clearance is provided between the seal and the trunnion, a proper sealing engagement is assured and each flange energizes the other to maintain a good sealing contact at all times. In the case of a universal joint, there is a constant turning or oscillation of the spiders 13 and the bearing races 12 and the seals 20 must accommodate this movement. Experience shows that relating turning movement can take place either between the inner seal flanges 24 and the shoulders 22 or between the outer seal flanges 25 and the bearing races 12 or at both of these places.

It is a feature of this invention that the Teflon facing layer 23 wraps entirely around the metal backing 21 so that it extends continuously from the sealing lip of the inner flange 24 across the bight portion 26 to the sealing lip of the outer flange 25. Thus, the seal 20 presents a continuous Teflon surface to the lubricant inside the bearing race 12 and there is no interruption in the Teflon surface through which lubricant might escape between the Teflon facing 23 and the metal backing 21 in the event of a flaw or a rupture in the bond between these two layers. In other words, a failure in the bond between the Teflon facing and the metal backing will not result in a failure of the seal that would permit lubricant to escape from the bearing race or alternatively that will permit either liquid or solid contaminants to gain access to the bearings 19 through the seals.

It also is a feature of the seal 20 that the relatively wide outer flange 25 extends in acute angular relation to the end face of the bearing race 12 so that the only physical contact between the flange and the race is at the lip of the flange. In this connection, it will be observed also that the flange 25 is rolled or curled slightly inwardly at the peripheral edge thereof to provide an annular sealing lip 27 that concentrates the area of contact between the flange and the race to a relatively narrow band, whereby to minimize friction and wear between the flange and the race. Preferably, the flange 25 extends at an angle of substantially 16 degrees with respect to the radius of the seal when the latter is in the normal unstressed condition. Of course, this angle changes when the seal is compressed at assembly in the manner hereinabove described, and the amount of change varies depending upon manufacturing tolerances. When the tolerances accumulate, to provide a maximum width between the inner end of the race 12 and the shoulder 22, the initial angle of the outer flange 25 changes relatively little; however, when the tolerances accumulate to provide a minimum spacing, the change in the inclination of the flange is greater.

It is desirable that the construction and that the characteristics of the metal from which the backing 21 is made be such that the latter is not overstressed in any condition normally obtaining at assembly. In general, the optimum angle for the low rate spring flange 25 is the maximum angle that will not make the radius of the bight 26 too small. Manifestly, some stretching of the metal takes place when the inner flange 24 is rolled out in the formation of the seal and it is desirable that the flange 24 be as narrow as possible and that the bight 26 have as large a radius as possible in order to minimize tearing of the metal and loss of the part in manufacture. The rate of the spring flange 25 becomes less as the angle of inclination increases, and it is desirable, of course, to have the rate as low as possible, as it assures maximum deflection under different size conditions of the universal joint with minimum change in the load on the seal within the tolerance range normally encountered. At the same time, it provides a sufficient loading of the seal under minimum tolerance conditions to assure a good sealing engagement but does not cause excessive pressure at the sealing surfaces under maximum tolerance conditions which results in excessive wear of the seal. In any event, it will be apparent that when the seal is collapsed and energized at assembly, the relatively wide and flexible flange 25 yields to absorb most of the force. Thus, it is desirable that the outer flange 25 be as wide as possible to assure maximum flexure thereof with minimum loading of the sealing area. It is desirable also that the backing 21 be essentially thin for maximum flexibility and so that it will not impose excessive pressure on the Teflon facing under any normal condition of use. It has been found that a backing approximately 0.004–0.006 inch thick gives satisfactory results. A backing of this thickness and of heat hardenable spring metal imposes a load of approximately 15 pounds on the sealing surfaces of the Teflon facing 23 under minimum permissible tolerance dimensions normally provided in a universal joint of the type here under consideration and a load of about 35 pounds per square inch on the sealing surfaces under maximum permissible tolerance conditions. The Teflon facing 23 is shown of exaggerated thickness in the drawing, but in practice it too can be quite thin. In general, it should be as thin as possible so that the metal backing 21 can absorb any heat developed in use at the bearing surface relatively quickly. Under these conditions, the Teflon facing 23 functions efficiently with relatively little wear and the metal backing 21 maintains adequate sealing pressure on the surfaces being sealed far longer than any seal heretofore used in the particular environment here illustrated and described. In the environment provided by the universal joint, wear of the Teflon facing 23 may become excessive if the load at the sealing surfaces exceeds 50 pounds per square inch and a permanent set takes place in the metal backing 21 if the load pressure exceeds about 80 pounds per square inch. Thus, it is desirable that the different conditions affecting the load and deflection characteristics of the seal be coordinated to produce optimum results.

From the foregoing, it is readily apparent that the seal of this invention is capable of long life in service, that it is inexpensive to produce, and that it may be readily installed.

While one commercially practical embodiment of the invention has been described and illustrated herein somewhat in detail, it will be understood that various changes may be made as may come within the purview of the accompanying claims.

Having thus described the invention, I claim:

1. In the manufacture of a seal, the steps of bonding a facing layer of heat labile material having a low coefficient of friction to a backing of work hardenable metal to produce a laminated sheet,
   cutting a blank from said laminated sheet, and
   then forming the blank to the shape of the seal with the facing layer exposed for engagement with a surface to be sealed while
   simultaneously hardening the metal backing by the forming operation to provide the necessary spring and resiliency in said backing required in use to maintain said facing pressed against said surface with sufficient force to maintain sealing contact therebetween under different manufacturing tolerance conditions.

2. In the manufacture of a seal, the steps of bonding a heat labile Teflon facing layer to a backing of essentially thin, work hardenable steel to produce a laminated sheet,
   cutting a blank of annular shape from said laminated sheet, and then
   forming the blank thus produced to a substantially U shape in transverse section to provide laterally spaced sealing flanges having the facing layer at the outer sides of the U and of said flanges while
   simultaneously hardening the metal backing by the forming operation to provide essential spring and resiilency in said backing without damage to the heat labile Teflon facing layer.

References Cited

UNITED STATES PATENTS

| 2,734,757 | 2/1956 | Martin. |
| 2,850,792 | 9/1958 | Cobb. |
| 3,145,996 | 8/1964 | Ninos et al. _____ 308—187.2 X |
| 3,206,262 | 9/1965 | Haag _____ 277—235 X |
| 2,293,184 | 8/1942 | Weissert _____ 29—480 X |
| 2,761,202 | 9/1956 | Beare. |
| 2,852,840 | 9/1958 | Harvey _____ 29—480 X |

CHARLIE T. MOON, *Primary Examiner.*